United States Patent [19]
Nagasaki et al.

[11] Patent Number: 5,436,662
[45] Date of Patent: Jul. 25, 1995

[54] IMAGING APPARATUS HAVING A SOLID STATE MATRIX-TYPE IMAGING ELEMENT AND PULSE GENERATOR FOR THE EXPANDING THE DYNAMIC RANGE

[75] Inventors: Tatsuo Nagasaki, Yokohama; Tohru Wada, Tokyo, both of Japan

[73] Assignee: Olympus Optical Co., Ltd., Tokyo, Japan

[21] Appl. No.: 57,105

[22] Filed: May 3, 1993

[30] Foreign Application Priority Data

May 1, 1992 [JP] Japan .................................. 4-112779

[51] Int. Cl.$^6$ .......................... H04N 5/335; H04N 3/14
[52] U.S. Cl. ..................................... 348/312; 348/294; 348/302; 348/281; 348/282
[58] Field of Search ................ 358/213.11, 213.23, 358/213.27, 213.31, 228, 213.28; H04N 5/335, 3/14; 348/281, 282, 298, 302, 311, 312, 294

[56] References Cited

U.S. PATENT DOCUMENTS

| | | | |
|---|---|---|---|
| 4,459,619 | 7/1984 | Yoshida | 358/213.28 |
| 4,975,778 | 12/1990 | Park | 358/228 |
| 5,040,070 | 8/1991 | Higashitsutsumi et al. | 358/228 |

FOREIGN PATENT DOCUMENTS

| | | | |
|---|---|---|---|
| 2-50584 | 2/1990 | Japan | H04N 5/335 |
| 335228 | 2/1991 | Japan | 358/228 |
| 364277 | 3/1991 | Japan | H04N 5/335 |

Primary Examiner—James J. Groody
Assistant Examiner—Cheryl Cohen
Attorney, Agent, or Firm—Frishauf, Holtz, Goodman & Woodward

[57] ABSTRACT

In an imaging apparatus capable of expanding a dynamic range image signals of different levels are read simultaneously from a solid-state element whose light-receiving surface is divided. Read ½ frame image signals are switched by a changeover switch circuit at intervals of a ½ frame time. One of two image signals of different levels supplied from the two outputs of the changeover switch circuit is delayed at a delay circuit. Further, those image signals are separated into r, g, and b components, and then undergo logarithmic conversion into image signals of multiple desired levels. The signals are digitized at an A/D converter and undergo operations at an adder, which adds while keeping their logarithmic characteristic, and at an inverse logarithmic converter. A luminance signal is obtained at a matrix circuit, and is converted into a logarithm at a logarithmic circuit. The lighting irregularity components of the resulting signal are suppressed. This signal is compressed, and the compressed signal is subtracted at a subtracter to obtain a compression coefficient, which is added to the digitized image signal from the A/D converter. Image signals of a wide dynamic range corrected at the inverse logarithmic converter are obtained for a single image at a TV rate on a real-time basis. Further, the control of exposure to the entire image and the expansion of the dynamic range are possible.

10 Claims, 11 Drawing Sheets

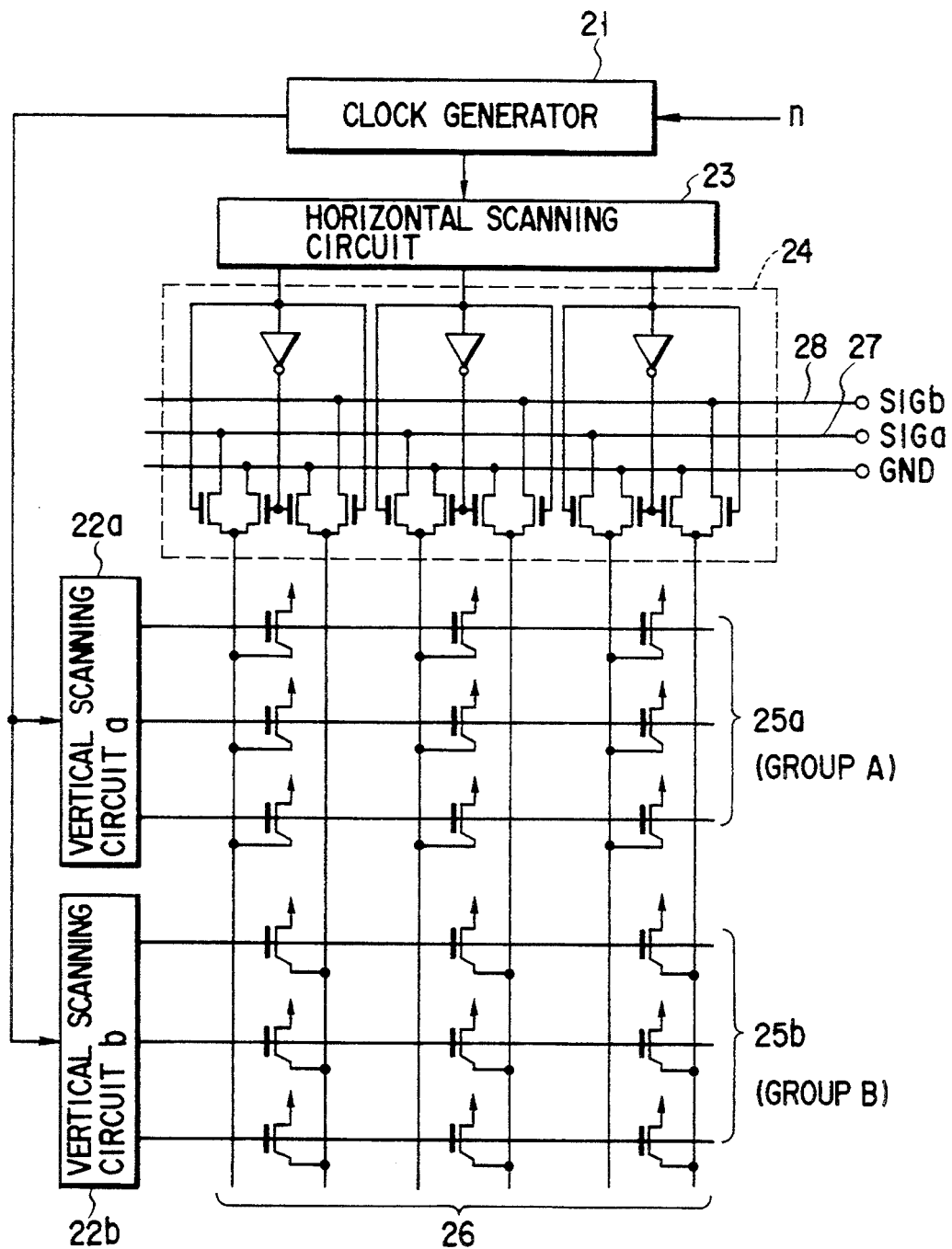
F I G. 2

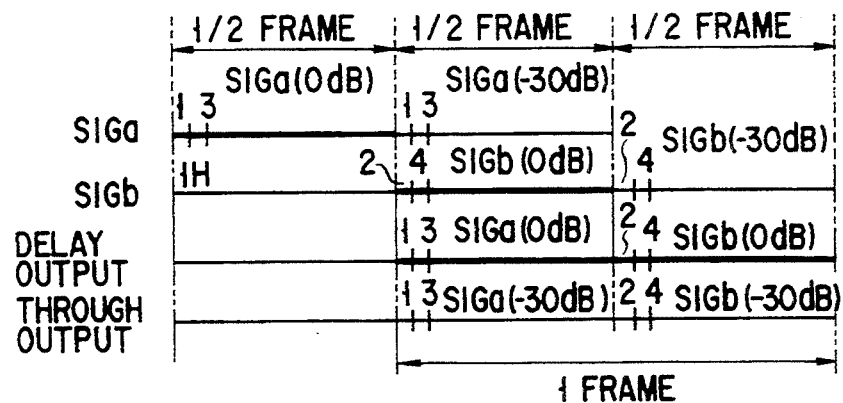
F I G. 8
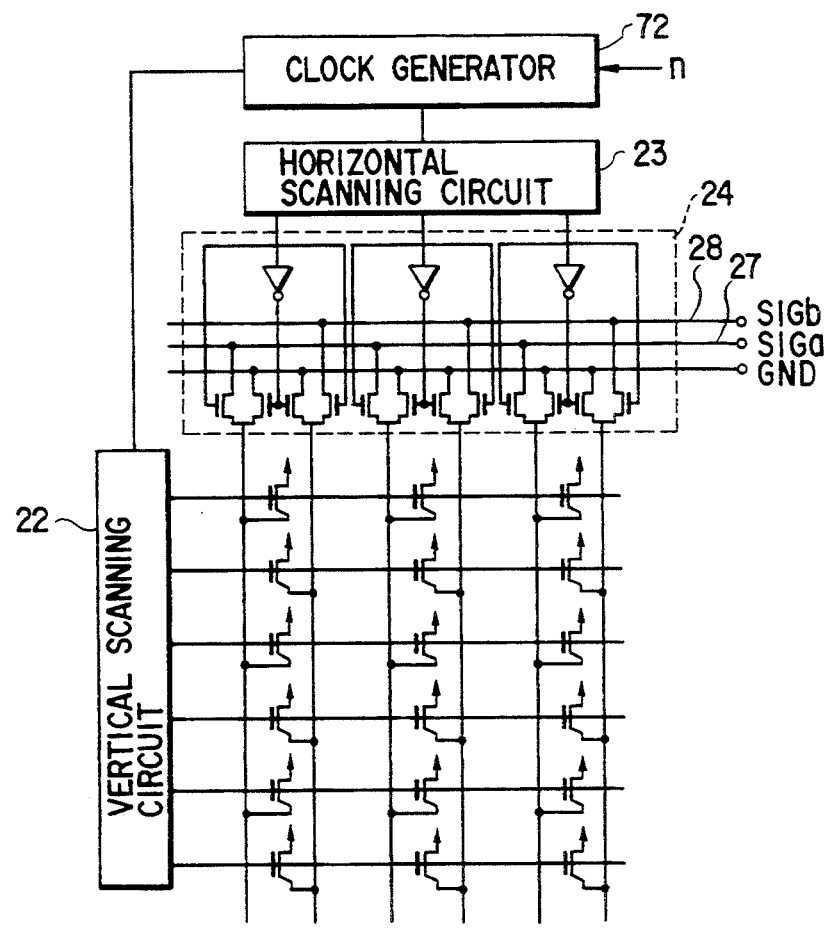
F I G. 9

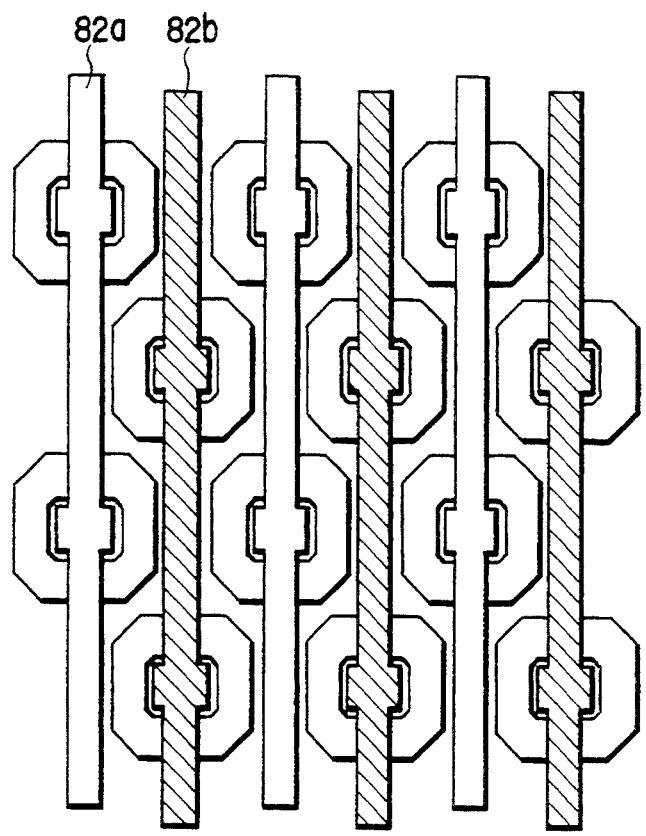
F I G. 15
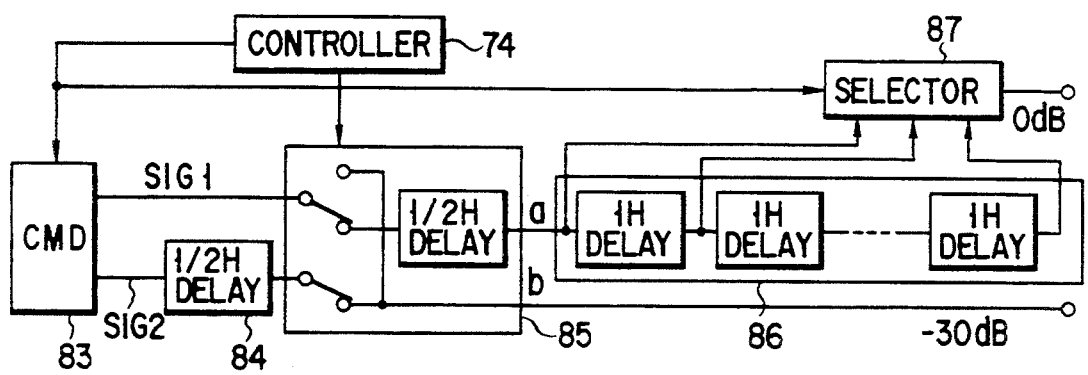
F I G. 16

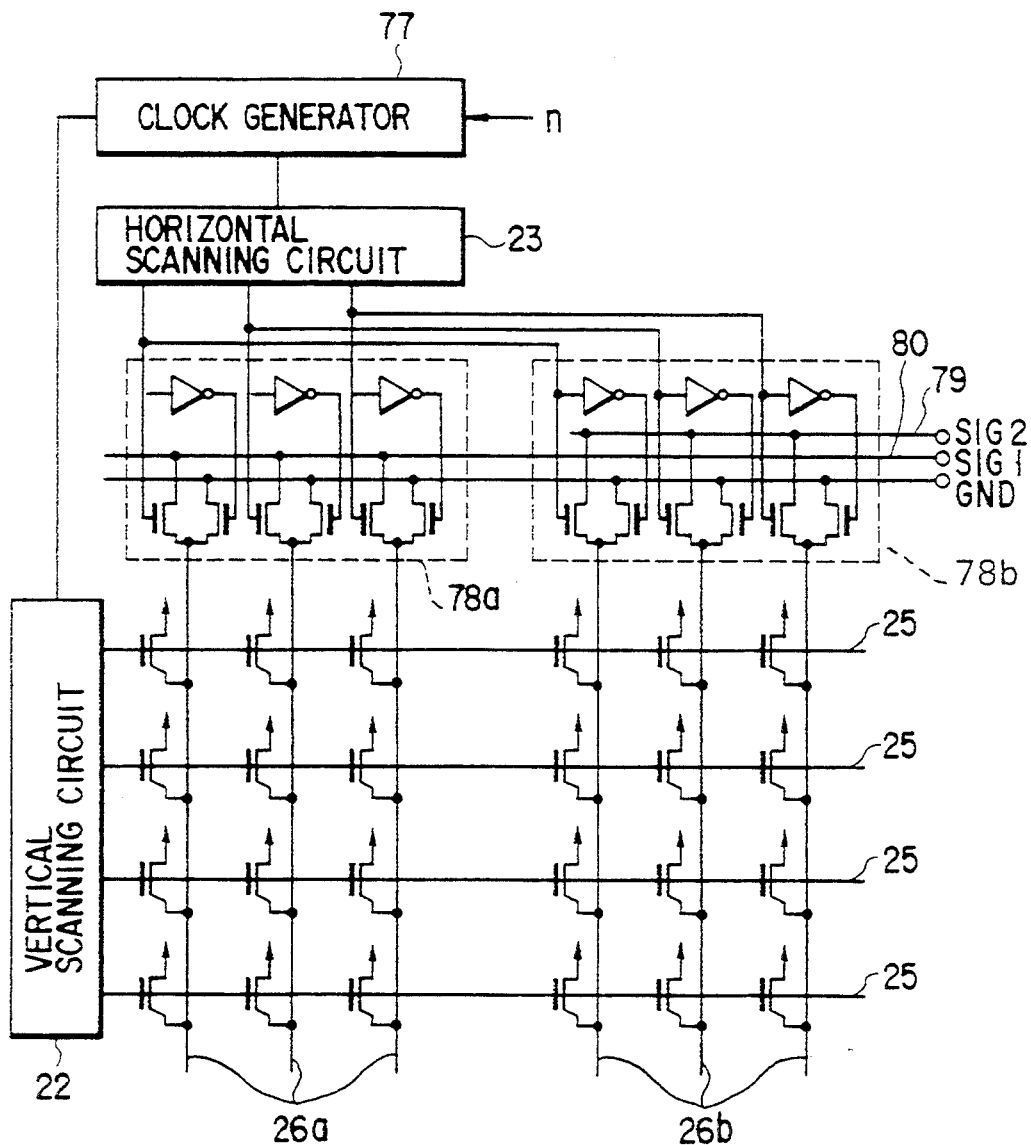
F I G. 17

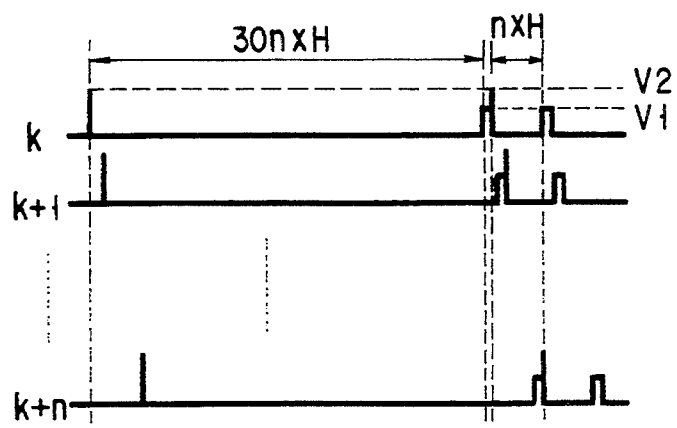
F I G. 18
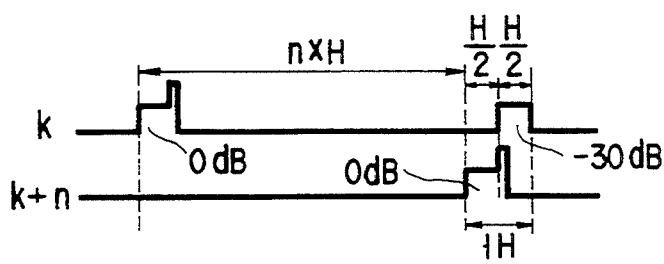
F I G. 19
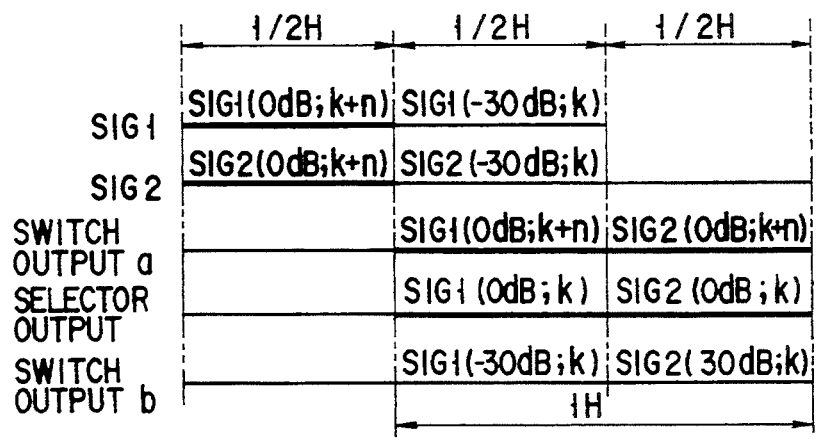
F I G. 20

IMAGING APPARATUS HAVING A SOLID STATE MATRIX-TYPE IMAGING ELEMENT AND PULSE GENERATOR FOR THE EXPANDING THE DYNAMIC RANGE

BACKGROUND OF THE INVENTION

1. Field of the Invention

This invention relates to an imaging apparatus capable of expanding the dynamic range of a solid-state imaging element.

2. Description of the Related Art

Various techniques o expanding the dynamic range of a solid-state &maging element such as a CCD o a CND have been proposed.

For instance, Published Japanese Patent Application No. 2-5058, filed by the applicant of this invention, has disclosed an imaging element designed to expand the dynamic ange by eading a plurality of images of different exposure time from a nondestructive imaging elemerit, storing them in a plurality of memories externally rovided, and then adding the stored images to each other.

Ordinary imaging apparatuses, including the imaging apparatus described in the above Japanese atent pplication No. 2-5058, reguire time to process several frames to obtain a single image of a wide dynamic range.

That is, because a pictu:e is taken to or more times, if the exposure time is different, to obtain a single image oE a wde dynamic range needs processing time for to rames, esulting in a longer time required to obtain a single image.

SUMMARY OF THE INVENTION

Accordingly, the object of the present invention is to provide an imaging apparatus capable of producing a single image of a wide dynamic range at a TV rate on a real-time basis and facilitating the control of exposure to the entire image as well as the control of the dynamic range.

The foregoing object is accomplished by providing an imaging apparatus capable of expanding a dynamic range, comprising: an X-Y addressing solid-state imaging element which has pixels arranged in a matrix and photoelectrically converts an optical image into an image signal; pulse generating means for producing a pulse train for driving each pixel row of the solid-state imaging element, the pulse train being composed of a plurality of pulse sets, each set consisting of a pulse for resetting the accumulated charge on a pixel and a pulse for reading the imaging signal, and the time interval between the two pulses constituting the pulse set being changed at a specified ratio for each pulse set; and correction means for correcting an image signal on the basis of the time difference between multiple image signals read at each time interval changed at the specified ratio.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a concrete construction of the CMD of FIG. 1;

FIG. 8 shows each output signal of the image apparatus of the second embodiment;

FIG. 9 is a diagram showing the construction of a CMD used in an image apparatus according to a third embodiment of the present invention;

FIG. 15 is a view of the arrangement of phototransistor and wiring on a CMD chip of the present invention;

FIG. 16 is a diagram showing the arrangement of the CMD peripheral circuitry used to apply the imaging apparatus of the fourth embodiment to the FIG. 1 system;

FIG. 17 is a schematic diagram of a CMD used in the imaging apparatus of the fourth embodiment;

FIG. 18 shows the waveforms of pulses supplied from the clock generator circuit to the vertical scanning circuit;

FIG. 19 shows pulse trains applied to specified lines; and

FIG. 20 shows the relationship between the output of the CMD, the output signal of the changeover switch circuit, and the output of the selector used in the fourth embodiment.

DETAILED DESCRIPTION OF THE PREFERRED EMBODIMENTS

Referring to the accompanying drawings, embodiments of the present invention will be explained in detail.

Figure 1:
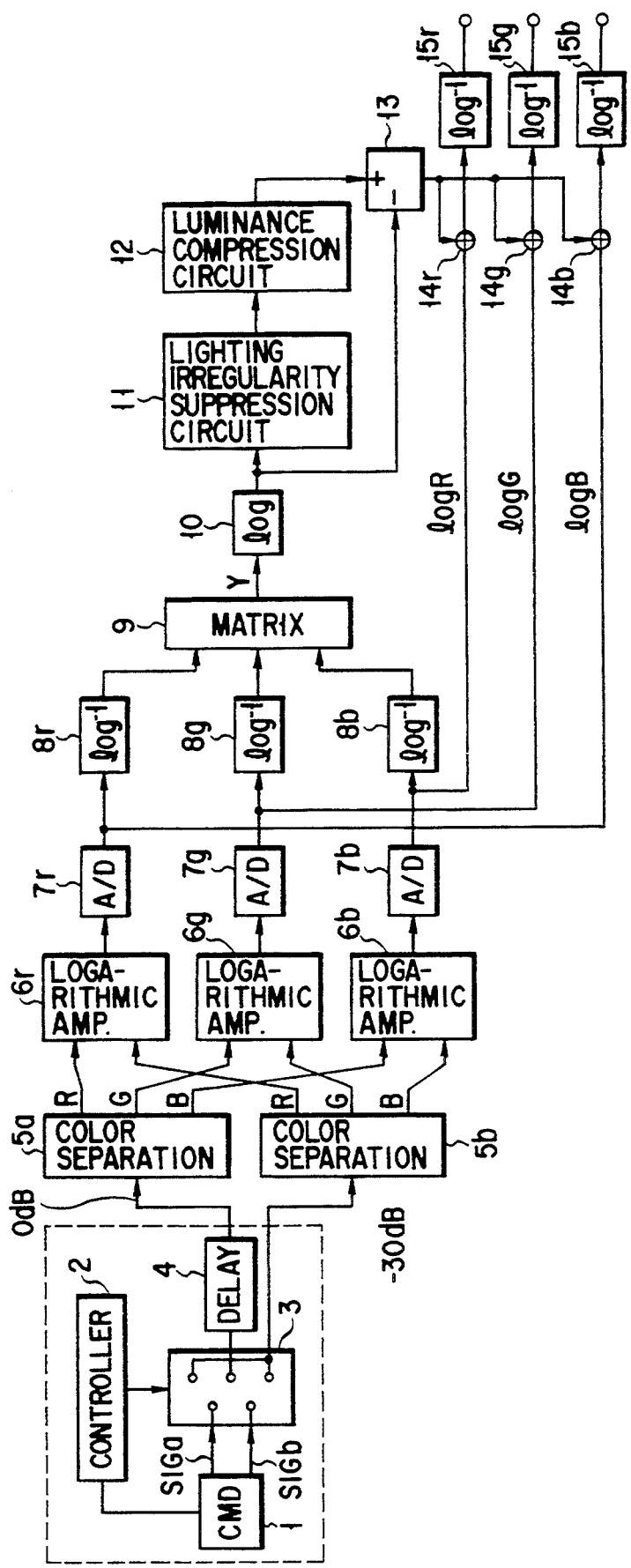
FIG. 1 is a block diagram showing the construction of an imaging apparatus according to a first embodiment of the present invention.

FIG. 1 is a schematic diagram of an imaging apparatus according to a first embodiment of the present invention.

A CMD (Charge Modulation Device) 1, which is an imaging element with an electronic shutter function, produces two signals, SIGa and SIGb simultaneously. A concrete construction of the CMD is shown in FIG. 2.

In the CMD 1, a clock generator circuit 21 produces pulse trains necessary for vertical and horizontal scanning and supplies them to vertical scanning circuits 22a and 22b and a horizontal scanning circuit 23, respectively.

The vertical scanning circuits 22a and 22b specify lines to be read from and controls exposure time explained later. The CMD 1 is provided with the separate vertical scanning circuits 22a and 22b so as to allow the separate scanning of the upper half and the lower half of the light-receiving elements arranged in a matrix. Hereinafter, the light-receiving element (pixel) rows 25a scanned by the vertical scanning circuit 22a is called group A, and the light-receiving element rows 25b scanned by the vertical scanning circuit 22b is called group B.

Two output lines, a read line 27 for group A and a read line 28 for group B, are provided so as to individually read the output on the lines scanned by the vertical scanning circuits 22a and 22b. To the vertical scanning circuits 22a and 22b, pulses a1, . . . , b1 . . . , are applied simultaneously as shown in FIG. 3.

Figure 3:
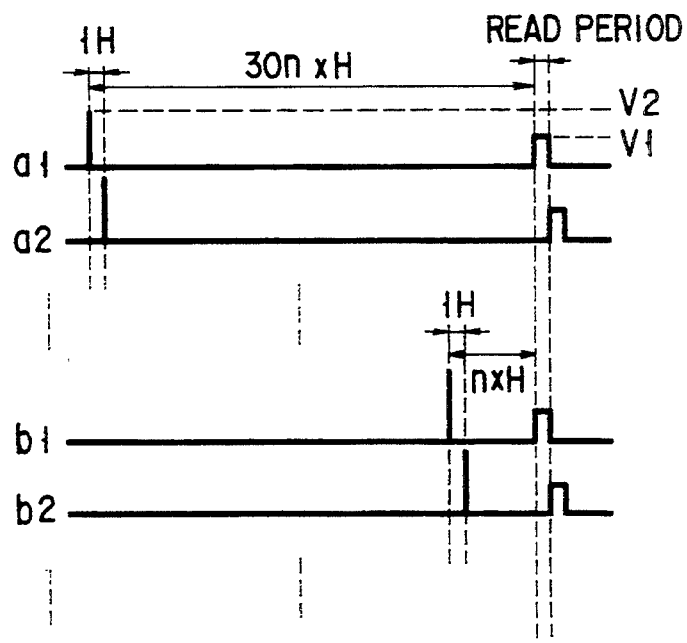
FIG. 3 shows the waveforms of the pulses applied to the vertical scanning circuit of FIG. 1.

For those pulses, a high-level pulse ($V_2$) shown in FIG. 3 is a reset pulse for resetting the charge on each pixel of the CMD 1, and a low-level pulse ($V_1$) is an image-signal read pulse. Each vertical scanning circuit produces the output by delaying the input signal for a specified horizontal scanning time (hereinafter, referred to as H) as pulse a1, a2, . . . . Specifically, first the vertical scanning circuit 22a applies pulse a1 shown in FIG. 3 to the first line of group A and the vertical scanning circuit 22b applies pulse b1 to the first line of group B simultaneously. Similarly, pulse a2 and pulse b2 are applied to the second line of each group at the same time.

As a result, the group-A read line (SIGa) 27 supplies a signal of an exposure time of 30n×H (n is an integer) and the group-B read line (SIGb) 28 supplies a signal of an exposure time of n×H. The lightreceiving rows (light-receiving surface) of the CMD is divided into the upper half and the lower half. Since the respective halves are scanned at the same time for reading, the vertical scanning completes reading in half an ordinary one frame time.

In the remaining ½ frame time, the scanning pulses in group A and group B are exchanged, with the result that the signal line 27 supplies a signal of an exposure time of n×H and the signal line 28 supplies a signal of an exposure time of 30n×H.

In FIG. 1, a controller 2 supplies an exposure time signal to the CMD 1 and a switching signal to a changeover switch circuit 3 so as to switch signals at intervals of half a frame.

The changeover switch circuit 3, under the control of a switching signal per half a frame, switches the output of group A and group B of the CMD 1 between a first output line (0-dB line) with a delay circuit 4 and a second output line (−30-dB line) without a delay circuit. This allows an image signal of an exposure time of 30n×H to always be supplied to the delay circuit 4, which delays the input signal for a ½ frame time. Thus, a delay circuit 4 functions as a correction means for correcting a time difference between multiple image signals, as will be clear from the following.

That is, with the ratio of exposure time 30n×H to n×H being 30:1, if the former image signal is at 0 dB, then the latter image signal will be at approximately 30 dB. Hereinafter, a signal of an exposure time of 30n×H from group A is called SIGa (0 dB) and a signal of an exposure time of n×H from group A is called SIGa (−30 dB). Similarly, signals from group B are called SIGb (0 dB) and SIGb (−30 dB), respectively.

Figure 4:
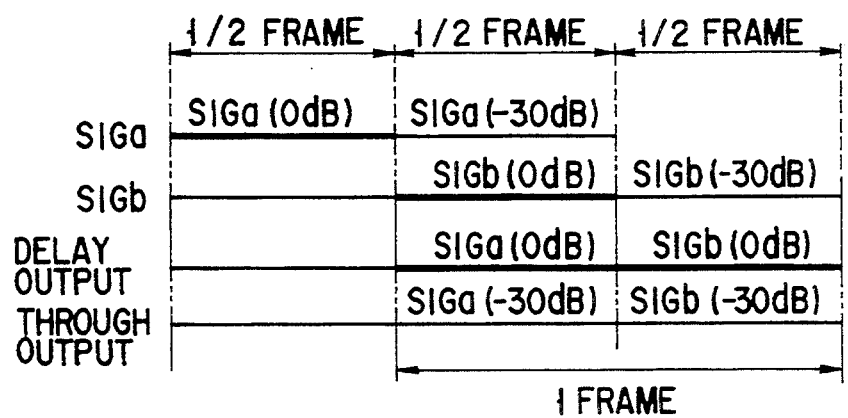
FIG. 4 shows the relationship between the output signal of the CMD, the output signal of the delay circuit, and the undelayed output of the changeover switch circuit.

FIG. 4 shows the relationship between the outputs SIGa and SIGb of the CMD 1, the output (delay output) of the delay circuit 4, and the through output, which is the undelayed output of the changeover switch circuit 3.

A 0-dB image scanned a ½ frame earlier shown in FIG. 4 is delayed for a ½ frame by the delay circuit 4. The resulting image, together with the −30-dB signal of the same pixels, is supplied to color separation circuits 5a and 5b in the next stage.

Figure 5:
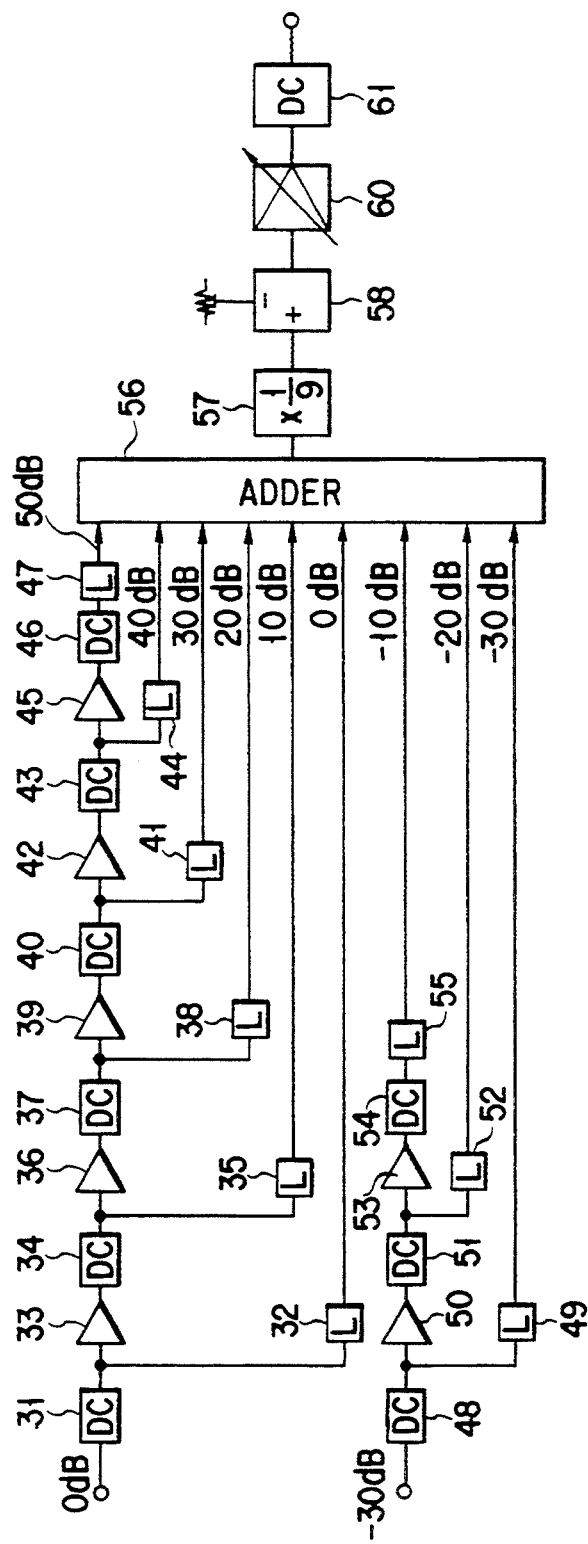
FIG. 5 is a concrete construction of the logarithmic amplifier of FIG. 1.

The color separation circuits 5a and 5b separate each image into component r, component g, and component b, which are converted by logarithmic amplifiers 6r, 6g, and 6b into a logarithmic characteristic, respectively. A concrete arrangement of the logarithmic amplifiers 6r, 6g, and 6b is shown in FIG. 5. For shortness' sake, the logarithmic amplifier 6r is taken as an example.

A −30-dB image signal and a 0-dB image signal are supplied to the logarithmic amplifier 6r. The 0-dB image signal is first supplied via a dynamic clamp circuit 31 to a limiter circuit 32 and an amplifier 33 arranged in parallel in the next stage.

The limiter circuit 32 limits the signal to a specified level and sends the resulting signal to an adder 56.

The 0-dB image signal is amplified to a 10-dB signal by the amplifier 33. This signal passes through a dynamic clamp circuit 34 and is limited to a specified level by a limiter circuit 35, which converts it into a 10-dB signal, which is supplied to the adder 56.

Similarly, a 20-dB signal, a 30-dB signal, a 40-dB signal, and a 50-dB signal processed in the same way are supplied to the adder 56.

On the other hand, two stages of amplifiers 50 and 53 are provided for a −30-dB signal, which is converted into a −30-dB signal, a −20-dB signal, and a −10-dB signal, which are supplied to the adder 56.

Figure 6:
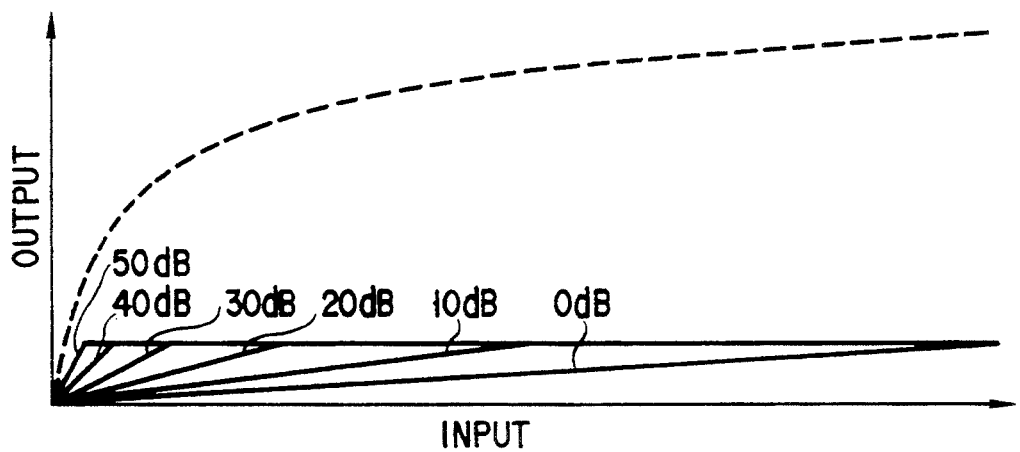
FIG. 6 is a characteristic diagram where the individual output signals from the adder are added to each other.

The adder 56 adds the −30-dB, −20-dB, . . . , 0-dB, . . . , 50-dB outputs to each other, as shown in FIG. 6. The resulting added output signal has a logarithmic characteristic as shown by broken lines in FIG. 6. Because the output signal has the maximum value nine times as large as a specified level, it is multiplied by 1/9 by a multiplier 57 to reduce to the specified level. The resulting signal is supplied via a dynamic clamp circuit 61.

A subtracter 58 and an amplifier 60 are used when the dynamic range of the input signal is small. The subtracter 58 subtracts a specified level from the signal depending on the dynamic range of the input signal. After the signal is amplified by the amplifier 60 so as to compensate for the amount subtracted at the subtracter 58, the resulting signal is supplied via the dynamic clamp circuit 61.

In FIG. 1, those logarithmic amplifiers 6r, 6g, and 6b perform the optimum logarithmic conversion, regardless of how great the dynamic range of the input is.

The signals subjected to logarithmic conversion at the logarithmic amplifiers 6r, 6g, and 6b are then converted into digital values, while keeping the logarithmic characteristic, by A/D converters 7r, 7g, and 7b, respectively. The outputs of the A/D converters 7r, 7g, and 7b are sent, while maintaining the logarithmic characteristic, to adders 14r, 14g, and 14b and inverse logarithmic converters ($\log^{-1}$) 8r, 8g, and 8b.

The inverse logarithmic converters 8r, 8g, and 8b, which contain ROMs, supply the value of the original signal according to the value of the logarithmic characteristic input.

With this arrangement, an ROB signal with a dynamic range of 90 dB is obtained. This signal is supplied to a matrix circuit 9, which produces a luminance signal Y.

The luminance signal Y is converted into a logarithm at a logarithmic circuit 10, which produces log Y. The lighting irregularity components of log Y are suppressed by a lighting irregularity suppression circuit 11, which produces log Y'. A luminance compression circuit 12 compresses this, using coefficients $\alpha$ and $\beta$, into $\alpha \log \beta Y'$.

The subtracter 13 subtracts log Y from the compressed $\alpha \log \beta Y$ and obtains a compression coefficient $\log \beta Y'^{\alpha}/Y$. This is added to logarithmic characteristic signals log R, log G, and log B at the adders 14r, 14g, and 14b. If compression coefficient $\log \beta Y'^{\alpha}/Y = \log k$, the resulting signals will be log kR, log kG, and log kB, respectively. Form these signals, inverse logarithmic circuits 15r, 15g, and 15b produce kR, kG, and kB.

The lighting irregularity suppression circuit 11 and the luminance compression circuit 12 are described in detain in Japanese Patent Application No. 4-41451, so that their explanation will be omitted here.

With the first embodiment, a 90-dB image signal is obtained and displayed on a real-time basis. An imaging apparatus, such as a camera, with a wide dynamic range capable of dealing with moving pictures can be constructed of a single imaging element. Further, by changing n, exposure time can be controlled.

While in the first embodiment, the ratio of two different exposure times is 30:1, changing the ratio allows easy control of the dynamic range of the input. Although two stages of exposure time are used, more than two stages of exposure time may be used.

Figure 7:
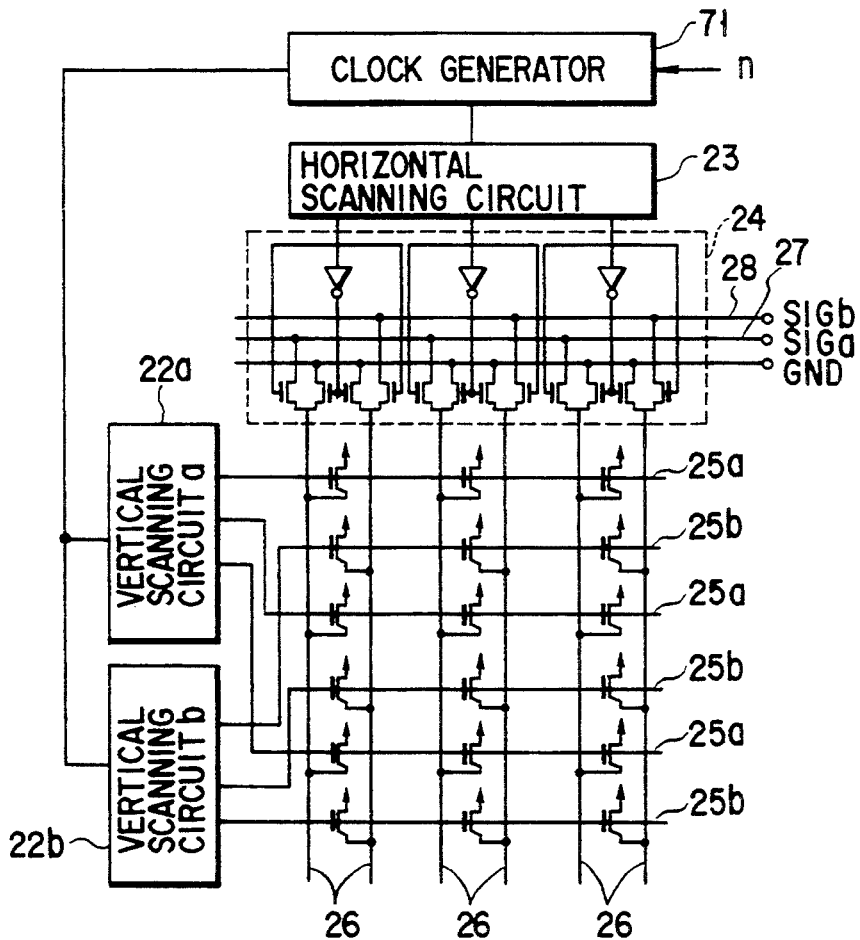
FIG. 7 is a diagram showing the construction of a CMD used in an image apparatus according to a second embodiment of the present invention.

FIG. 7 is a schematic diagram of an imaging apparatus according to a second embodiment of the present invention, where the construction of the imaging element CMD is different from that of the first embodiment. Of the component members of the second embodiment, those equivalent to the members in FIG. 2 are indicted by the same reference symbols, and their explanation will be omitted.

The CMD of the second embodiment is composed of a clock generator circuit 71, a horizontal scanning circuit 23, a signal read circuit 24, vertical scanning circuits 22a and 22b, and a plurality of light-receiving elements arranged in a two-dimensional matrix. Wiring is done so that the odd lines 25a of the two-dimensional matrix may be scanned by the vertical scanning circuit 22a, and the even lines 25b may be scanned by the vertical scanning circuit 22b.

A signal read circuit 24 is provided with a read line 27 for reading signals SIGa on the odd lines scanned by the vertical scanning circuit 22a and a read line 28 for reading signals SIGb on the even lines scanned by the vertical scanning circuit 22b. These lines are designed for the independent scanning and reading of the odd and even lines.

The system shown in FIG. 1 is applied to such a CMD. Driving pulse signals shown in FIG. 3 are used as in the first embodiment.

Each output signal of the imaging apparatus thus constructed will be explained, referring to FIG. 8.

As shown in FIG. 8, during a ½ frame time, a 0-dB image and a −30-dB image on the odd lines are read simultaneously, and during the next ½ frame time, 0-dB image and a −30-dB image on the even lines are read simultaneously, thereby enabling interlace scanning.

Next explained will be an imaging apparatus according to a third embodiment of the present invention. This embodiment is different from the first embodiment in the construction of the CMD and the delay circuit.

The CMD used in the third embodiment, which is constructed as shown in FIG. 9, is composed of a clock generator circuit 72, a horizontal scanning circuit 23, a signal read circuit 24, a vertical scanning circuit 22, and light-receiving elements. The individual lines of the light-receiving elements arranged in a twodimensional matrix is scanned in sequence by a vertical scanning circuit 22.

As in the second embodiment, wiring to the read circuit 24 is done so that the signals SIGa on the odd lines and the signals SIGb on the even lines are read individually.

Figure 10:
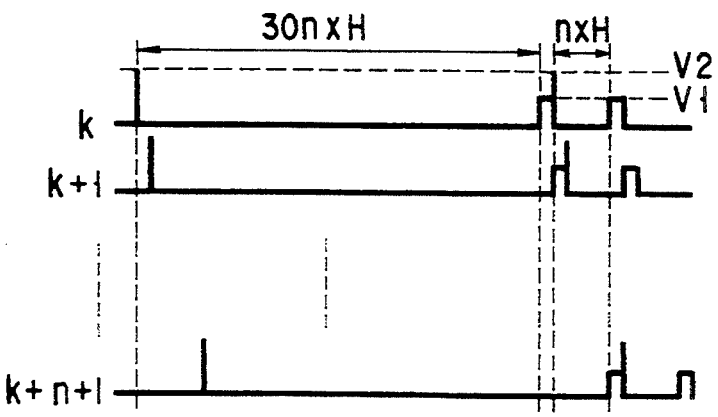
FIG. 10 shows the waveforms of pulses supplied from a clock generator circuit to a vertical scanning circuit.

The clock generator circuit 72, receiving a signal of exposure time from an external circuit, supplies pulses as shown in FIG. 10 to the vertical scanning circuit 22. The vertical scanning circuit 22 delays each pulse signal for 1 H and supplies the delayed pulse signal to each line, starting at the first line, the second line, . . . .

The delayed pulse is read during a 1-H period after $30n \times H$ (n is an integer) has elapsed since the application of the reset pulse, and immediately after this, is reset and $n \times H$ later, is read again. Because the ratio of the exposure time of two reads is 30:1, the first read provides a 0-dB image signal and the second read provides a −30-dB image signal.

$n \times H$ after the 0-dB image has been obtained, the reading of the −30-dB image signal is started. Because the time required for reading is 1 H, the difference between the starting time of reading the 0-dB image and the −30-dB image is $(n+1) \times H$. During this time, the scanning circuit scans as far as nth+1 line.

Figure 11:
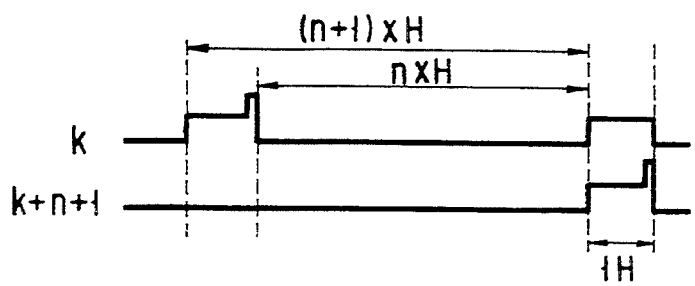
FIG. 11 is a time chart showing the reading timing for a $-30$-dB image on the kth line and a 0-dB image on the kth$+$(n$+$1) line.

Thus, as shown in FIG. 11, the timing of reading a −30-dB image on kth line coincides with that of reading a −0-dB image on kth+(n+1) line.

n is set at an even number. When k is an odd number, k+1(n+1) is an even number when k is an even number, k+(n+1) is an odd number.

As described above, the odd lines and the even lines are read independently at the same time, so that a −30-dB image on kth line and a 0-dB image on kth+(n+1) line can be individually read by two read lines.

The exposure time can be changed by changing n in a manner that n=2, 4, 6, 8, . . . . In this case, if the number of lines of CMD (the number of pixels in the vertical direction) is N, n must meet the following expression:

$$(30n+1)+(n+1)=31n+2 \leq N$$

Figure 12:
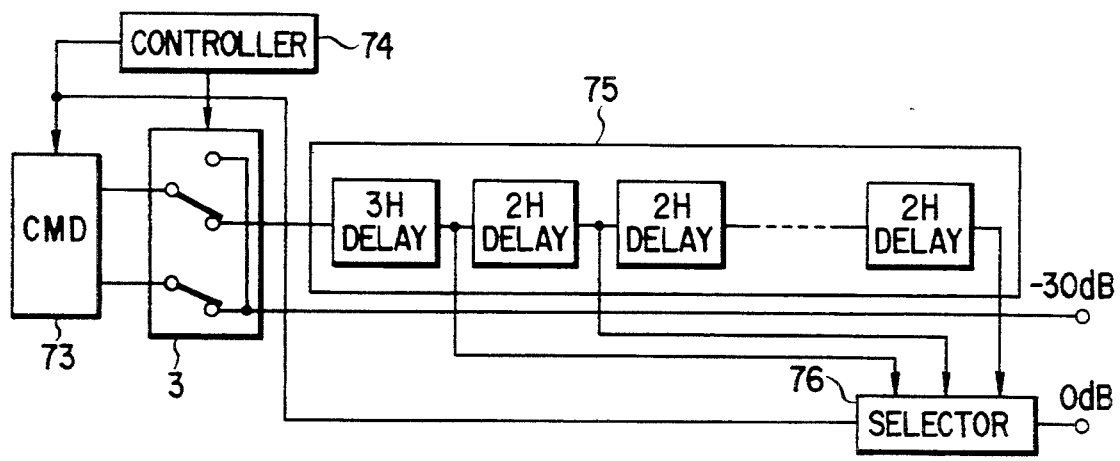
FIG. 12 is a diagram showing the arrangement of the CMD peripheral circuitry used to apply the imaging apparatus of the third embodiment to the FIG. 1 system.

The arrangement of CMD peripheral circuitry for applying the CMD to the FIG. 1 system is shown in FIG. 12.

A changeover switch circuit 3, to which two output signals SIGa and SIGb are supplied from the CMD 73, switches the output signals from the CMD 73 between a path with a delay circuit 75 and a path without a delay circuit under the control of the signal of a 1-H period from the controller 74. In this case, the signal supplied to the delay circuit 75 is always a 0-dB signal, and the signal not passing through the delay circuit 75 is always a −30-dB signal.

The controller 74 sends the value of n, a signal determining the exposure time, to the CMD 73 and a selector 76. The delay circuit 75, whose first stage has a tap for a 3-H delay and subsequent stages have taps at intervals of a 2-H delay, supplies the delayed signals to the selector 76.

The selector 76 selects a signal to be output from the taps of the delay circuit 75 according to the value of n supplied from the controller 74. That is, the output delayed for (n+1) H with respect to the value of n is selected.

In this way, it is possible to obtain a 0-dB image and a −30-dB image on the same line. In addition, changing n allows easy adjustment of exposure.

while in this embodiment, the ratio of two different exposure times is 30:1, the ratio is not restrictive but may be changed. Changing the ratio enables the control of the dynamic range. Additionally, although two stages of exposure time are use, more stages of exposure time may be used.

Figure 13:
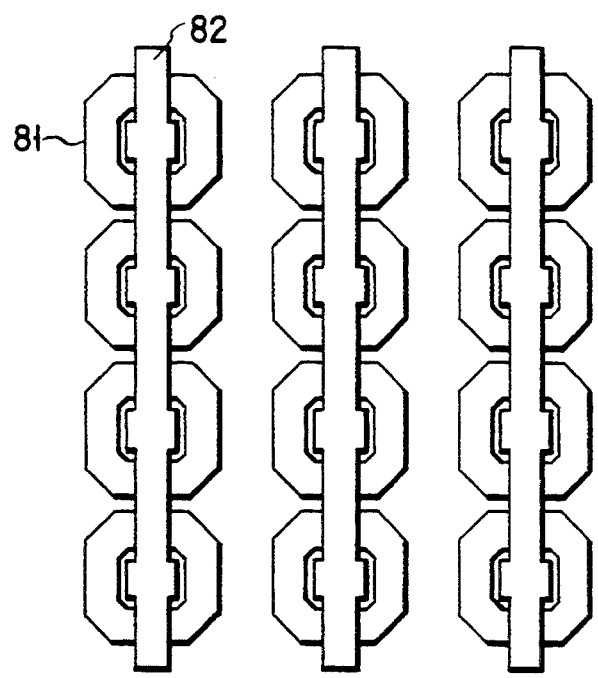
FIG. 13 is a view of the arrangement of phototransistors and wiring on a conventional CMD chip.

Phototransistors, which are light-receiving elements (pixels), are arranged on an ordinary CMD chip as shown in FIG. 13, when viewed from the top. In the arrangement, a gate 81 is formed in a ring on a phototransistor and functions as a light-receiving portion.

Figure 14:
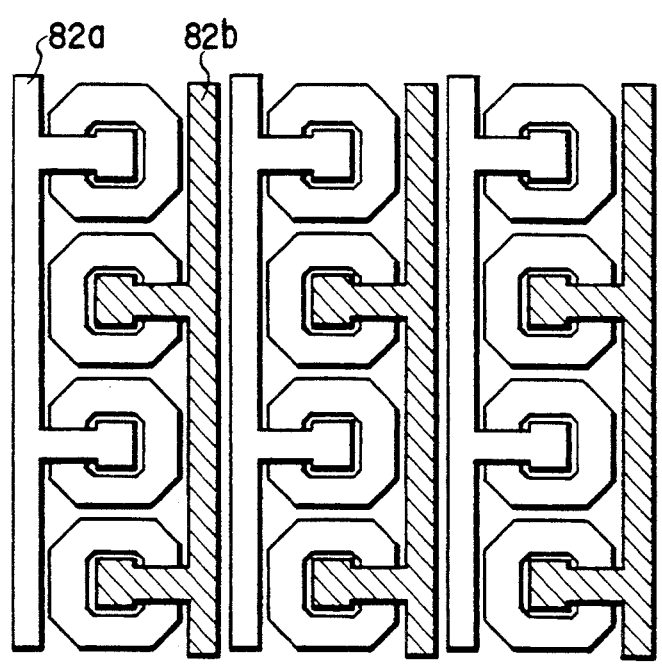
FIG. 14 is a view of the arrangement of phototransistors and wiring on a conventional CMD chip with pixels provided with separate read lines for the even and odd lines.

On the inside of the ringed gate 81, the source portion (not shown) of the phototransistor is formed. An electrode 82 connected to the source portion is formed. This electrode 82 is shared by the phototransistors placed lengthwise, and is connected to a read circuit (not shown). The outside of the ringed gate 81 is the drain portion of the phototransistor, which is common to all phototransistors.

with the CMD thus constructed, when a read line for the even lines and that for the odd lines are provided separately as shown in FIG. 9, the pixels on the CMD chip are arranged as shown in FIG. 14. In this arrangement, two wires run between pixels, which makes it impossible to make the distance between elements smaller, leading to the reduced resolution.

Therefore, in a CMD used in this embodiment, the pixels on the odd line are shifted horizontally half a pixel pitch away from the pixels on the even line. With this arrangement, the read line wire can be run straight so as to go through the center of the pixels as found conventionally, and only a single line running between pixels helps to narrow the distance between pixels, thereby preventing a decrease in the resolution.

Next explained referring to FIGS. 16 through 19 will be an image apparatus according to a fourth embodiment of the present invention, which produces a −30-dB image signal and a 0-dB image signal. What is explained in the fourth embodiment is limited only to the characteristic portions, while the remaining arrangement and members are assumed to be the same as those of the first embodiment.

FIG. 17 is a schematic diagram of a CMD used in the fourth embodiment.

In the CMD of FIG. 17, each row of the gate portions of phototransistors arranged in an N×N two-dimensional matrix is connected to a vertical scanning circuit 22, while each column of the source portions is connected to read circuits 78a and 78b. The read circuits 78a and 78b are connected to the sources of the individual lines so that the former may read from the pixels ranging from 1 to N/2 in the horizontal direction and the latter may read from the pixels ranging from N/2+1 to N.

The read circuits 78a and 78b are scanned simultaneously by a horizontal scanning circuit 23, with the result that the signals of two pixels a distance of N/2 pixels apart from each other horizontally are read at the same time.

A clock generator circuit 77 sends pulses as shown in FIG. 18 to the vertical scanning circuit 22. n in FIG. 18, which is a positive integer determining the exposure time, is supplied from an external controller (not shown) to the clock generator circuit of the CMD.

At exposure time $30n \times H$ after the accumulated charge on the corresponding line of the CMD is reset by a reset pulse ($V_2$) shown in FIG. 8, reading is done by a read pulse ($V_1$). Immediately after this, resetting is done again, and then the pulse train, which is used to read again after $n \times H$ and is delayed 1 H for each line, is applied.

Because one line is divided into the first half and the second half, the time required for reading is ½ H.

FIG. 19 shows pulse trains applied to kth line and kth+n line. As shown, because the pulse train is delayed 1 H for each line, the time difference between kth line and kth+n line is $n \times H$. A first read (0 dB) from kth+n line and a second read (−30 dB) from kth line is carried out successively during 1 H.

FIG. 16 is a block diagram of the CMD peripheral circuitry for applying the imaging apparatus of the fourth embodiment (FIG. 17) to the FIG. 1 system.

The controller 74 sends signal n determining the exposure time to the CMD 83 and the selector 87, and a switching signal to a changeover switch circuit 85.

The output signal SIG2 of the CMD 83 is delayed for ½ H at the delay circuit 84, and is supplied to the changeover switch circuit 85. On the other hand, the output signal SIG1 of the CMD 83 is directly supplied to the changeover switch circuit 85.

The changeover switch circuit 85 first delays the signal SIG1 for ½ H and supplies same as output signal a as well as directly supplies the already ½ H-delayed signal SIG2 as output signal b. After ½ H has elapsed, the changeover switch circuit 85 is switched by the control signal from the controller 74, with the result that the switch circuit directly supplies the signal SIG1 as output as well as delays the already ½ H-delayed signal SIG2 for another ½ H as output signal a. From this time on, the same operation is repeated at intervals of ½ H.

The output signal a of the changeover switch circuit 85 is connected to the delay circuit 86 that has taps at intervals of a 1-H delay. Each tap of the delay circuit 86 is connected to the selector 87. The selector 87, in response to the signal n from the controller 76, selects and outputs a $n \times H$ delayed signal.

FIG. 20 shows the relationship between the output signals SIG1 and SIG2 from the CMD 83, the output signals a and b from the changeover switch circuit 85, and the output signal of the selector 87.

In this way, a 0-dB image and a −30-dB image can be obtained within one frame time. Since there is almost no time difference between the 0-dB image and the −30-dB image, the embodiment is most suitable for a moving subject.

While in the fourth embodiment, the ratio of two different exposure times is 30:1, the ratio is not restrictive but may be variable. Changing the ratio enables the control of he dynamic range. Although two stages of exposure time are used, more stages of exposure time may be used.

As explained above, with the embodiments of the present invention, two images of different exposure time can be obtained within one frame time using a single imaging element such as a CMD, which allows a single image of a wide dynamic range to be obtained at a TV rate on a real-time basis.

Additionally, it is easy to control the exposure to the entire image as well as the dynamic range.

In an imaging apparatus thus constructed, an X-Y addressing image element (CMD), whose exposure time is shifted for each line, is used and multiple images of different exposure time are read individually at the same time under the control of the vertical scanning pulse, thereby reproducing an image of a wide dynamic range.

This invention is not limited to the above-mentioned embodiments but may be practiced or embodied in still other ways without departing from the spirit or essential character thereof.

As described above in detail, the present invention provides an imaging apparatus capable of obtaining a single image of a wide dynamic range at a TV rate on a real-time basis, facilitating the control of exposure of the entire image and the control of the dynamic range.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An imaging apparatus using a solid-state imaging element capable of expanding a dynamic range, comprising:
   an X-Y addressing solid-state imaging element having pixels arranged in a matrix of rows and columns, and which photoelectrically converts an optical image into an image signal;
   pulse generating means for generating a pulse signal for driving each pixel row of said solid-state imaging element, the pulse signal comprising:
   a plurality of pulse sets, said plurality of pulse sets including at least two pulse sets, each pulse set having a reset pulse for resetting an accumulated charge on a pixel and a read pulse for reading said image signal;
   a pulse train for changing a time interval between the reset pulse and the read pulse at a desired specified ratio for each pulse set; and
   a plurality of pulse trains for generating said pulse train for each of the pixel rows at a predetermined time difference; and
   correction means for correcting a time difference between multiple image signals read at each time interval changed at said specified ratio, such that said image signals are simultaneously output to said solid-state imaging element.

2. The imaging apparatus of claim 1, wherein said imaging element has a plurality of horizontal rows, and the apparatus further comprises:
   means for scanning said Rlurality of horizontal rows in a vertical direction at a light-receiving surface of the matrix of said solid-state imaging elements, said scanning means including means for separately scanning odd rows and even rows, and two output lines respectively corresponding to the odd and even rows.

3. The imaging apparatus of claim 1, wherein said imaging element has a plurality of vertical columns, and the apparatus further comprises:
   means for scanning said plurality of vertical columns in a horizontal direction at a light-receiving surface of the matrix of said solid-state imaging elements, and wherein said columns are divided into right half and left half columns, and said scanning means including means for separately scanning said right half and left half columns, and two output lines corresponding to the respective right and left half columns.

4. The imaging apparatus of claim 1, wherein said pixels of said solid-state imaging element comprise:
   light-receiving elements, each of said liqht-receiving elements including a ringed gate and a light-receiving source portion formed in the ring of the ringed gate, said pixels being arranged in odd lines and even lines which are horizontally shifted half a pixel pitch away from each other, and said pixels also being arranged in columns;
   electrodes formed along said columns and connected to said individual light-receiving source portions; and
   separate read lines coupled to said even lines and odd lines, respectively.

5. The imaging apparatus of claim 1, wherein:
   said plurality of pulse trains comprises a plurality of pulse sets including at least a first pulse set in which the time interval between the reset pulse and read pulse is a first time difference, and a second pulse set in which the time interval between the reset pulse and read pulse is a second time difference;
   said plurality of pulse sets are generated for each of the pixel rows at a predetermined time difference; and
   a time required for scanning all of the pulse sets is shorter than an accumulated vertical scanning time.

6. The imaging apparatus of claim 1, wherein said correction means comprises a time delay circuit.

7. An imaging apparatus using a solid-state imaging element capable of expanding a dynamic range, comprising:
   an X-Y address type solid-state imaging element having a plurality of pixels which are arranged in a matrix of rows and columns, and which pixels are divided into at least two groups, the pixels of each of said at least two groups producing a partial image signal by photoelectric conversion;
   pulse generating means for generating a pulse train including a plurality of pulse sets which are to be applied to the pixels of each row of each group at predetermined equal or different intervals so as to drive the pixels, each of said pulse sets including a resetting pulse for resetting an accumulated charge on a pixel and a reading pulse for reading said partial image signal, said reading pulse being generated after a time interval arbitrarily determined with reference to a timing of generation of said resetting pulse; and correction means for applying the pulse train generated by the pulse generating means to the pixels of each row of each group and for reconstructing an original image by synthesizing partial image signals which are read out from each group at different timings.

8. An imaging apparatus according to claim 7, wherein said pixels of said X-Y address type solid-state imaging element are divided into two groups in a vertical direction of the matrix, are divided into two groups in a horizontal direction of the matrix, and are divided into two groups made up of odd- and even-numbered array groups.

9. The imaging apparatus of claim 7, wherein:

said plurality of pulse sets includes at least a first pulse set in which the time interval between the reset pulse and read pulse is a first time difference, and a second pulse set in which the time interval between the reset pulse and read pulse is a second time difference;

said plurality of pulse sets are generated for each of the pixel rows at a predetermined time difference; and a time required for scanning all of the pulse sets is shorter than an accumulated vertical scanning time.

10. The imaging apparatus of claim 7, wherein said correction means comprises a time delay circuit.

* * * * *